(No Model.)

W. EARLE.
COOKING RACK.

No. 446,855. Patented Feb. 24, 1891.

Witnesses: Ralph W. E. Hopper, Eben Hutchinson Jr.

Inventor: William Earle, per Eugene Humphrey, his atty.

THE NORRIS PETERS CO., PHOTO-LITHO., WASHINGTON, D.C.

UNITED STATES PATENT OFFICE.

WILLIAM EARLE, OF BOSTON, MASSACHUSETTS.

COOKING-RACK.

SPECIFICATION forming part of Letters Patent No. 446,855, dated February 24, 1891.

Application filed October 24, 1890. Serial No. 369,176. (No model.)

*To all whom it may concern:*

Be it known that I, WILLIAM EARLE, of Boston, in the county of Suffolk and State of Massachusetts, have invented a new and useful Improvement in Cooking-Racks, which will, in connection with the accompanying drawings, be hereinafter fully described, and specifically defined in the appended claims.

My invention relates to a cooking rack or grate for use in a pan in a meat-roasting oven; and the invention consists in a folding adjustable rack possessing the novel features hereinafter fully described, and specifically pointed out in the appended claims.

Figure 1:
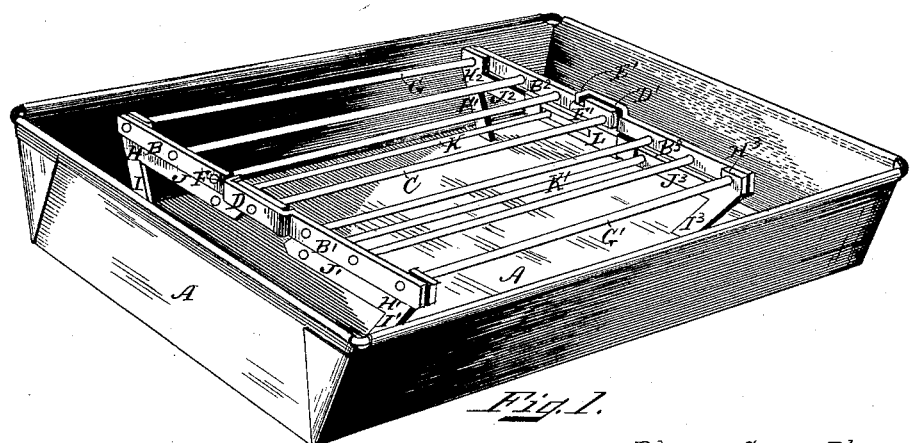
Figure 2:
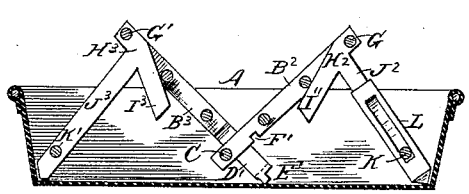
Figure 3:
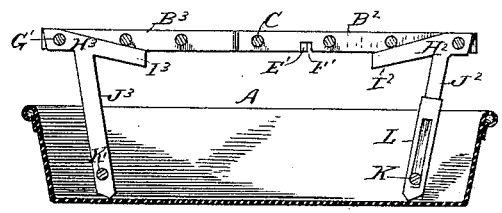
Figure 4:
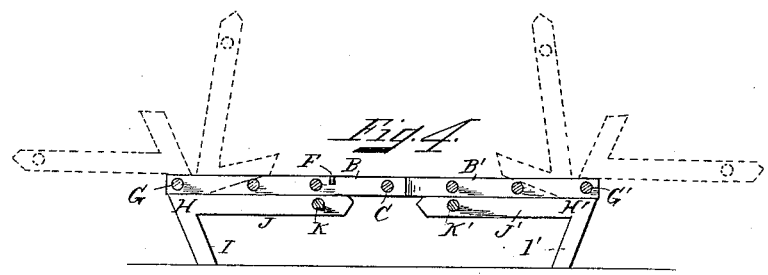
Figure 5:
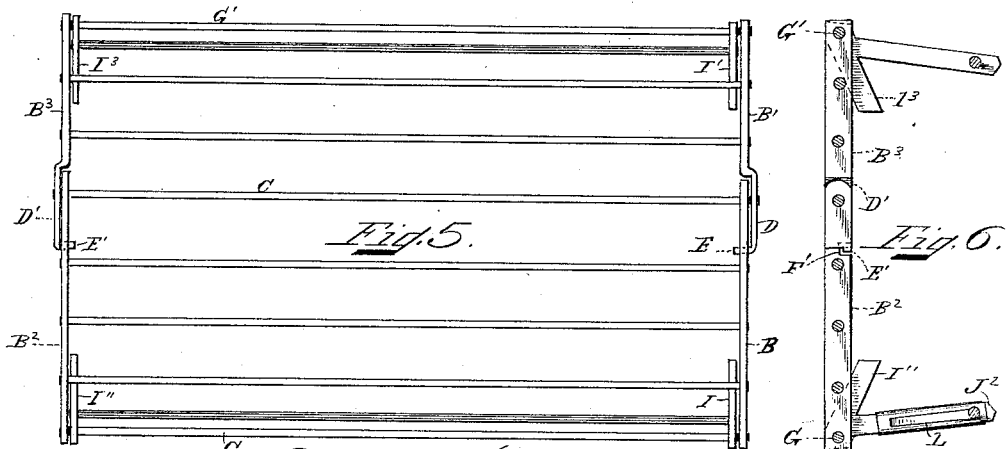
Figure 6:
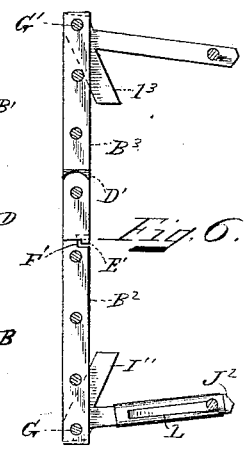

In the accompanying drawings, Figure 1 is a perspective view of my improved cooking-rack in position in a drip-pan and at its lowest elevation above the bottom of the pan. Fig. 2 is a sectional elevation showing the rack supported in an angular form. Fig. 3 is a like elevation showing the rack inverted relatively to its position in Fig. 1 and with its top at the highest elevation from the bottom of the pan. Fig. 4 is a cross-section of the rack and illustrates by dotted lines how the shorter legs of the angular supports are turned about their pivots or reversed so as to bring the longer legs into position to support the rack when inverted, as shown in Fig. 3. Fig. 5 is a plan or top view of the rack, and Fig. 6 is an end elevation of the same.

The rack illustrated in the drawings and embodying my invention is composed of several parts pivotally jointed together, and constructed and arranged to be interlocked so that it may be folded and adjusted to hold the meat or fowl to be roasted at various heights from the bottom of the pan and in different positions, as may be most convenient for the manipulations of the same by the cook, and for the most favorable and effective circulation of the heat about the same to secure the best results of cooking.

Referring to Fig. 1, A represents the pan, in which the rack is shown. The rack is composed of four metallic end pieces B B′ B² B³, connected by a number of horizontal wires or rods, as shown. The pieces B and B′ are pivotally connected by one end of the central rod C, and pieces B² and B³ are connected in like manner by the other and opposite end of rod C. The end pieces B′ and B³ each have an offset D and D′ at their inner ends, and also return bends or projections E and E′, which rest in notches F and F′ in the pieces B and B².

To the side connecting-rods G and G′ are pivoted the angular supports H H′ H² H³. These supports have short legs I I′ I² I³ and long legs J J′ J² J³, and these long legs J and J² are connected by rod K, and legs J² and J³ by rod K′. An extension-slide L is fitted to leg J³ and arranged to slide onto the end of leg J², and thus to interlock the two legs, as shown in Fig. 1, for convenience, to keep the legs compactly folded up under the body of the rack when the same is laid or hung away and not in use. By unlocking this slide-fastening and turning the rack over, the center may be depressed to the bottom of the pan and the sides raised and supported on the long legs J, when the rack will assume the form and position shown in Fig. 2, a very convenient form for roasting fowl, which will be properly supported, breast downward, in the well-adapted V-shaped space formed by the end pieces B and their connecting-wires when in the relative positions shown in Fig. 2, in which position the long legs of the rack are shown as braced and supported against the sides of the pan, and thus the position of the rack is maintained, but not necessarily, as the rack is self-supporting in said position. When the rack is in the position shown in Fig. 1, the center is kept from sagging under pressure by the interlocking of the offset and notched ends F and D of the end pieces B. When in the higher and inverted position shown in Fig. 3, the center of the rack is upheld by the short legs I bearing against the under side of the rods, while the long legs J rest obliquely under the rack upon the bottom of the pan, as shown. The rack thus constructed with reversible supports having legs of unequal lengths may be held at different elevations above the bottom of the pan, and by means of the jointed end bars may be also changed into the angular form shown in Fig. 2, as may be desired.

I claim—

1. A cooking-rack mounted upon pivoted supports having legs of unequal lengths, whereby the rack may be held at different heights, as specified.

2. A cooking-rack constructed with jointed ends and mounted upon reversible supports, whereby the rack may be changed from a level to a V-shaped form, as and for the purposes specified.

3. A cooking-rack composed of two pairs of end pieces B and B' and B² and B³, united by a series of horizontal rods, each pair being formed to interlock, as described, and both pivotally connected by the central rod C, and all mounted upon pivotal supports H, as specified.

4. In combination, the rack composed of the jointed end pieces B and their connecting-rods, the pivotal supports H, and the locking-slide L, whereby two of the long legs of the supports upon one end of the rack may be locked together under the rack, as and for the purposes specified.

WILLIAM EARLE.

Witnesses:
EUGENE HUMPHREY,
RALPH W. E. HOPPER.